(12) United States Patent
Liang et al.

(10) Patent No.: US 8,461,739 B2
(45) Date of Patent: Jun. 11, 2013

(54) STATOR FOR AN ELECTRIC MACHINE

(75) Inventors: Feng Liang, Troy, MI (US); Michael W. Degner, Novi, MI (US); Wei Wu, Canton, MI (US); Franco Leonardi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/566,723

(22) Filed: Sep. 25, 2009

(65) Prior Publication Data

US 2011/0074243 A1    Mar. 31, 2011

(51) Int. Cl.
*H02K 21/12* (2006.01)

(52) U.S. Cl.
USPC .................... 310/193; 310/216.112

(58) Field of Classification Search
USPC .............. 310/216.071–216.073, 216.096, 310/216.112, 186, 187, 193
See application file for complete search history.

(56) References Cited

U.S. PATENT DOCUMENTS

| | | | |
|---|---|---|---|
| 1,326,340 A * | 12/1919 | Hellmund | 310/216.073 |
| 1,381,505 A * | 6/1921 | Sandell | 310/216.072 |
| 1,723,912 A * | 8/1929 | Bergman | 310/176 |
| 4,508,998 A | 4/1985 | Hahn | |
| 4,713,569 A | 12/1987 | Schwartz | |
| 4,769,567 A | 9/1988 | Kurauchi et al. | |
| 5,107,159 A * | 4/1992 | Kordik | 310/156.44 |
| 5,378,953 A | 1/1995 | Uchida et al. | |
| 5,396,137 A | 3/1995 | Shinto et al. | |
| 5,610,464 A | 3/1997 | Asano et al. | |
| 5,705,871 A * | 1/1998 | Suzuki et al. | 310/156.44 |
| 5,801,463 A * | 9/1998 | Suzuki et al. | 310/51 |
| 5,886,440 A | 3/1999 | Hasebe et al. | |
| 5,909,072 A * | 6/1999 | Muller | 310/68 B |
| 6,008,559 A | 12/1999 | Asano et al. | |
| 6,127,764 A | 10/2000 | Torok | |
| 6,175,178 B1 | 1/2001 | Tupper et al. | |
| 6,285,104 B1 | 9/2001 | Nashiki | |
| 6,433,456 B1 * | 8/2002 | Higashino et al. | 310/263 |
| 6,445,100 B2 | 9/2002 | Tajima et al. | |
| 6,803,692 B2 | 10/2004 | Hattori et al. | |
| 6,858,968 B2 | 2/2005 | Takita et al. | |

(Continued)

FOREIGN PATENT DOCUMENTS

| | | |
|---|---|---|
| DE | 596013 C | 4/1934 |
| DE | 767611 C | 1/1953 |

(Continued)

OTHER PUBLICATIONS

German Patent Office, German Patent Office Action for the corresponding German patent application No. 10 2008 032 172.9-32 mailed Sep. 16, 2009.

(Continued)

*Primary Examiner* — Dang Le
(74) *Attorney, Agent, or Firm* — David B. Kelley; Brooks Kushman P.C.

(57) ABSTRACT

A stator for an electric machine has a circular stator body surrounding a rotor with an air gap therebetween. The stator has radially extending slots that define radially extending stator teeth. Multiple electric windings are located in the slots to define peripherally spaced magnetic poles. Separate coil groups establish multiple phases for the electric machine. Motor torque ripple is attenuated by forming the stator teeth with different widths for a given coil group.

9 Claims, 8 Drawing Sheets

U.S. PATENT DOCUMENTS

| | | | |
|---|---|---|---|
| 6,885,162 B2 * | 4/2005 | Stridsberg | 318/400.29 |
| 7,102,263 B2 | 9/2006 | Takano et al. | |
| 7,122,930 B2 | 10/2006 | Yamagishi et al. | |
| 7,170,209 B2 | 1/2007 | Araki et al. | |
| 7,196,445 B2 | 3/2007 | Yamaguchi et al. | |
| 7,342,338 B2 | 3/2008 | Miyazaki et al. | |
| 7,436,096 B2 | 10/2008 | Guven et al. | |
| 7,612,480 B2 | 11/2009 | Fujii et al. | |
| 8,018,109 B2 | 9/2011 | Leonardi et al. | |
| 2002/0074887 A1 | 6/2002 | Takano et al. | |
| 2004/0135454 A1 | 7/2004 | Takahashi | |
| 2005/0200223 A1 | 9/2005 | Tajima et al. | |
| 2006/0197399 A1 | 9/2006 | Kataoka et al. | |
| 2007/0052313 A1 | 3/2007 | Takahashi et al. | |
| 2007/0063607 A1 | 3/2007 | Hattori | |
| 2007/0210664 A1 | 9/2007 | Matsunobu et al. | |
| 2008/0231135 A1 | 9/2008 | Suzuki et al. | |

FOREIGN PATENT DOCUMENTS

| | | |
|---|---|---|
| DE | 69825386 T2 | 8/2005 |
| DE | 60204705 T2 | 5/2006 |
| DE | 112006001929 T5 | 5/2008 |
| EP | 1217713 A2 | 6/2002 |
| EP | 1763121 A2 | 3/2007 |
| EP | 1973217 A2 | 9/2008 |
| GB | 2452592 | 11/2009 |
| JP | 30033622 | 1/1991 |
| JP | 2004173375 | 6/2004 |
| JP | 2005-184957 | 7/2005 |
| JP | 2005184957 | 7/2005 |
| JP | 2005312102 | 11/2005 |

OTHER PUBLICATIONS

GB Search Report for Application No. GB0917697.5 dated Feb. 10, 2010.

* cited by examiner

STATOR FOR AN ELECTRIC MACHINE

BACKGROUND

1. Technical Field

The invention relates to a stator design for an electric machine capable of acting either as a motor or as a generator.

2. Background Art

It is known practice in the design of a conventional, brushless, multiple-phase motor-generator to use a rotor with permanent magnets arranged on its periphery, and a stator with a plurality of stator poles surrounding the permanent magnets. A magnetic flux flow pattern is developed when stator coils wound on the stator are energized with a multi-phase sinusoidal voltage.

The output torque of a multiple-phase electric machine comprises a uniform torque component and a varying torque component. The varying torque component is developed because of harmonic magnetic flux distributions in the stator and the rotor. The total torque output of the electric machine is the combination of the uniform component and the varying component, which results in a phenomenon called torque ripple. This torque ripple causes driveline speed oscillations, which can result in vehicle vibration and noise as the electric machine vibrations resonate in the vehicle body and chassis structure. The phenomenon of torque ripple is particularly significant at low vehicle speeds.

U.S. Pat. No. 6,867,524, which is assigned to the assignee of the present invention, describes one solution to the problem of torque ripple in electric machines. That solution involves forming the rotor of an electric machine into multiple segments. These segments are comprised of stacked permeable metal laminations with peripheral openings for receiving permanent magnets. As the magnet poles move across the stator poles, the magnetic flux field of the magnets interacts with the magnetic flux field of stator electrical windings that are energized by a multiple-phase voltage. The segments are skewed about the geometric axis of the rotor, one with respect to the other, so that the torque ripple created by a pole of each segment will tend to cancel the effect of the torque ripple of an adjacent pole so that the combined separate torque ripple components will be attenuated.

SUMMARY

The present invention provides an alternate solution to the torque ripple problem. It comprises a stator for an electric machine wherein the physical characteristics of the stator are modified to reduce the torque ripple effect described in the preceding discussion. The stator of the present invention may be comprised of multiple metal laminations, such as porous, ferrous laminations, that surround the periphery of the rotor with an air gap therebetween.

As in the case of known stator constructions for electric machines, the stator of the present invention has generally radial slots that accommodate stator coil windings wherein the slots are arranged with strategic peripheral spacing. The windings may be arranged in coil groups that define multiple poles.

The number of stator slots in the stator of the present invention and the number of phases for the electric machine will determine the operating characteristics of the electric machine. It will effectively reduce, for example, high torque ripple components, such as a $24^{th}$ order torque ripple that cannot effectively be attenuated using known skewing techniques for the rotor of an electric machine.

Although an embodiment of the invention herein disclosed is a three-phase machine, the invention may be used with an electric machine with different numbers of phases. It may be used in electric machines with permanent magnet rotors. The scope of the invention is not restricted by a particular design. The design of the present disclosure is chosen for the purpose of presenting examples of selected embodiments of the invention.

A conventional electric machine may have a stator with radial slots for accommodating stator windings surrounding a rotor with an air gap therebetween. The electrical angle ($\theta$) between two adjacent slots (slot pitch), the electrical angular displacement ($\gamma$) between stator coil winding groups and the coil pitch ($\delta$) are fixed for a given stator design and geometry. The design of the present invention, in contrast, removes the constraint that is imposed on the values for $\theta$, $\gamma$, and $\delta$ for known designs. In the case of the present invention, the values for $\theta$, $\gamma$, and $\delta$ can be of any magnitude consistent with the physical limits and dimensions of the stator.

The stator of the present invention has stator teeth defined by stator slots. Stator coil windings in the slots develop a stator flux flow pattern that interacts with a flux flow pattern for the rotor. The stator teeth have at least two circular thicknesses.

PARTICULAR DESCRIPTION OF THE INVENTION

In a conventional electric machine, as well as in an electric machine that embodies the present invention, the electrical angle between two adjacent slots, which is the slot pitch, can be computed as follows:

$$\theta = \frac{N_p}{2} \cdot \frac{360}{N_t}, \quad (1)$$

where:
$N_p$=pole number
$N_t$=slot number

Figure 8:
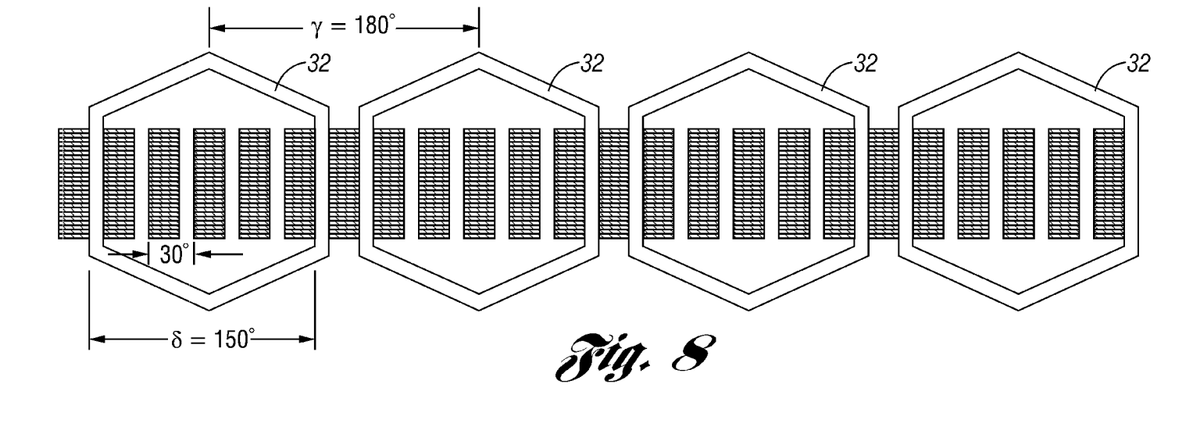
FIG. 8 is a schematic illustration of a conventional stator in which the tooth spacing or slot pitch is uniform wherein the stator has 24 slots, four poles and four coil groups, the slots being shown in an unwrapped form merely for purposes of illustration.
Figure 9:
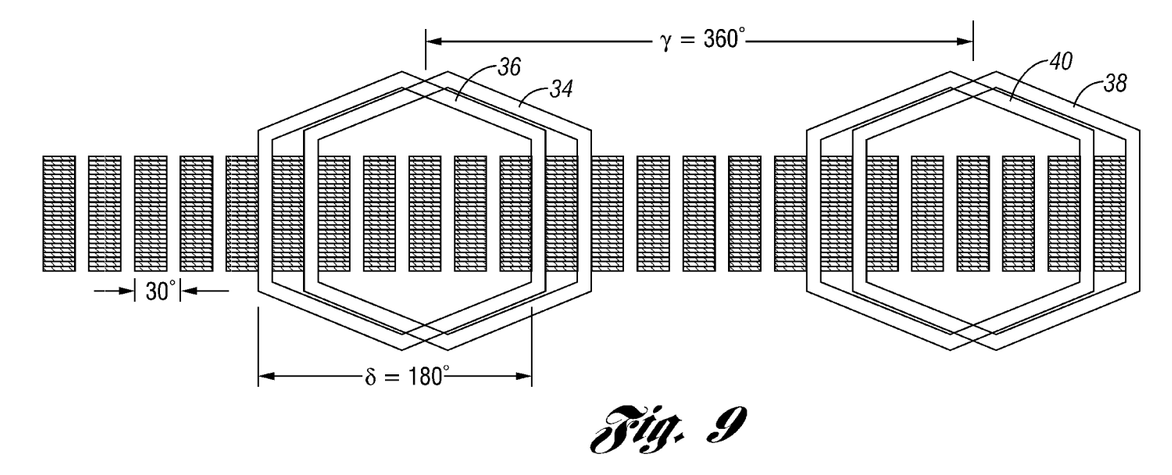
FIG. 9 is an unwrapped view of the slots for a conventional stator with 24 slots, four poles and two coil groups.

Each phase of the stator winding has $N_p$ or $N_p/2$ coil groups, where $N_p$ is a pole number of the electric machine. In a three-phase electric machine with four poles, each phase winding may have either four coil groups, as shown in FIG. 8, or two coil groups, as shown in FIG. 9.

The angular displacement δ between any two adjacent coil groups for the same phase measured in electrical degrees is set forth as follows:

$$\gamma = M*180, \quad (2)$$

where:
M=1 if the number of coil groups equals the pole number;
M=2 if the number of coil groups equals half the number of poles.

The span angle of a coil, which is the coil pitch in electrical degrees is determined as follows:

$$\delta = K_i\theta \quad (3)$$

where $K_i$=integer

Figure 1:
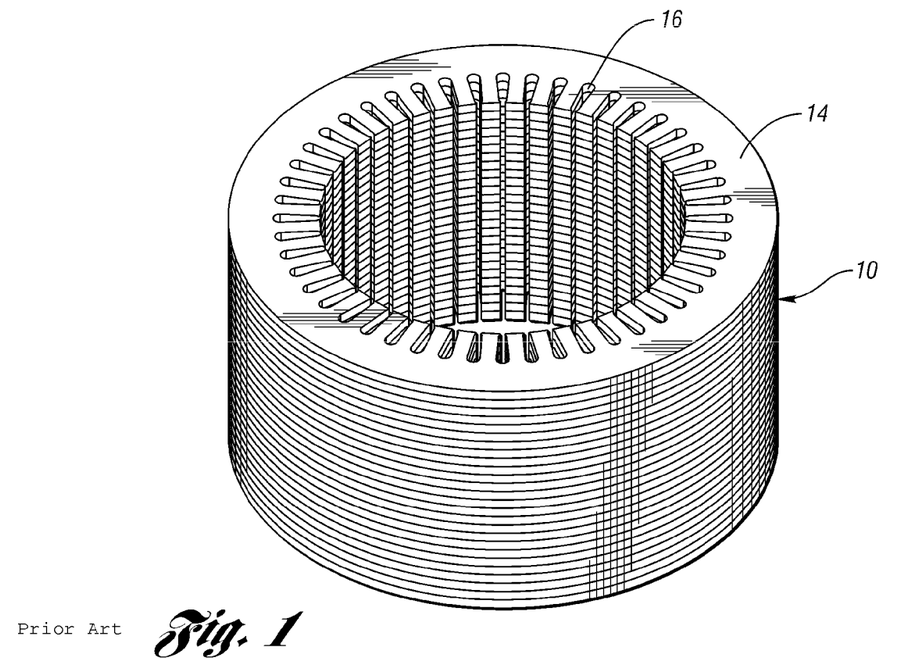
FIG. 1 is an isometric view of a stator with conventional internal slots extending in a radial direction.
Figure 2:
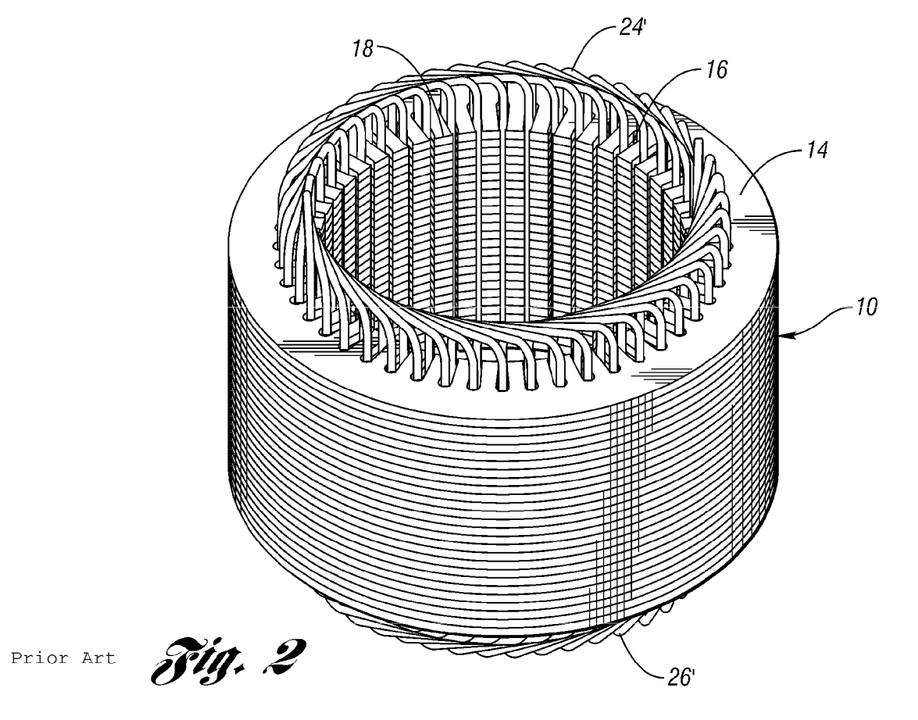
FIG. 2 is an isometric view of the stator of FIG. 1, wherein the electrical windings of the stator are illustrated.
Figure 5:
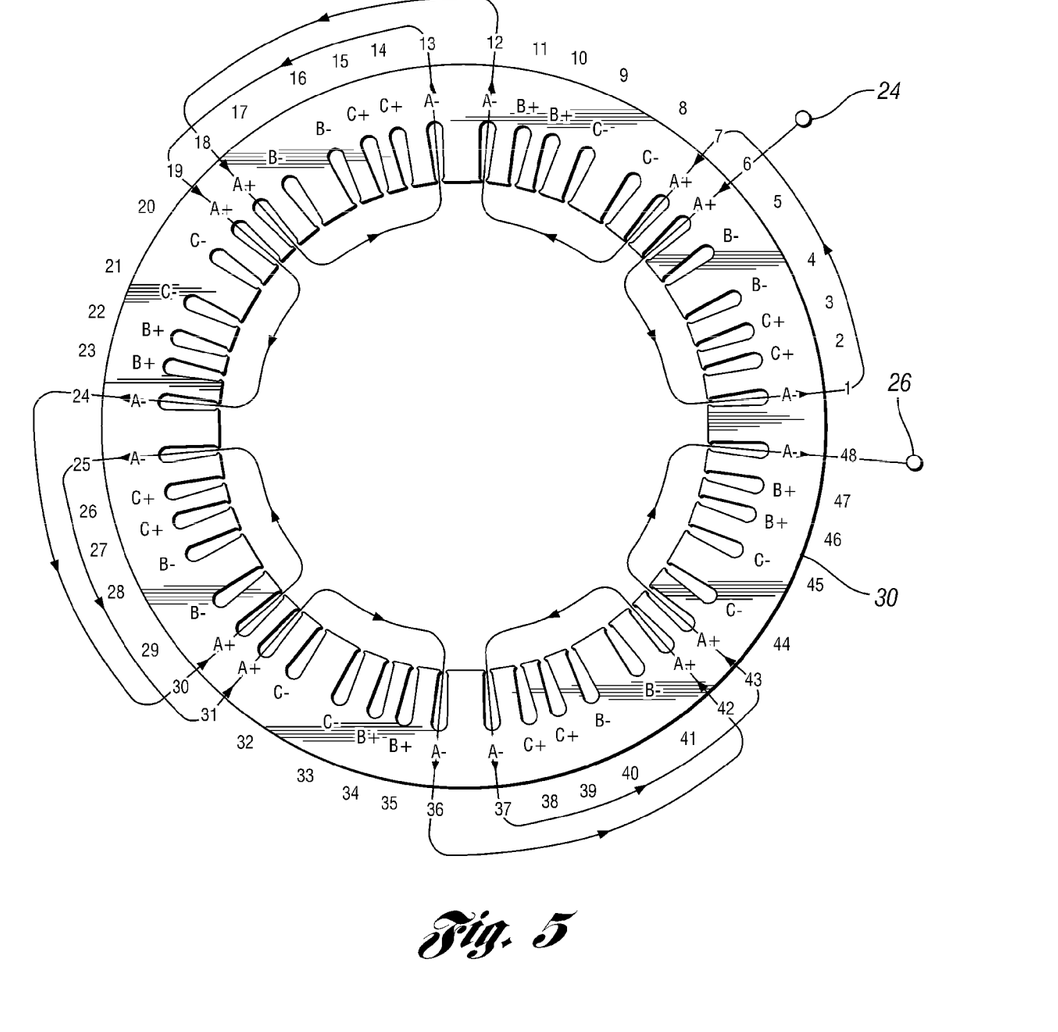
FIG. 5 is a schematic illustration of a single lamination for a stator according to a second embodiment of the invention wherein the stator teeth have three different thicknesses.

FIG. 1 shows at 10 a conventional stator for an electric machine. It comprises stacked multiple laminations of the kind shown at 12 in FIG. 3. FIG. 2 shows the stator of FIG. 1 with the coil windings 24' in place, as shown at 24' and 26' The windings are tied together at terminals for each phase, the terminals for one phase are seen in FIGS. 5 at 24 and 26.

The laminations may be formed of ferrous metal. They may be circular in form. When they are stacked together, they form a cylindrical body as illustrated in FIG. 1 at 14.

Figure 3:
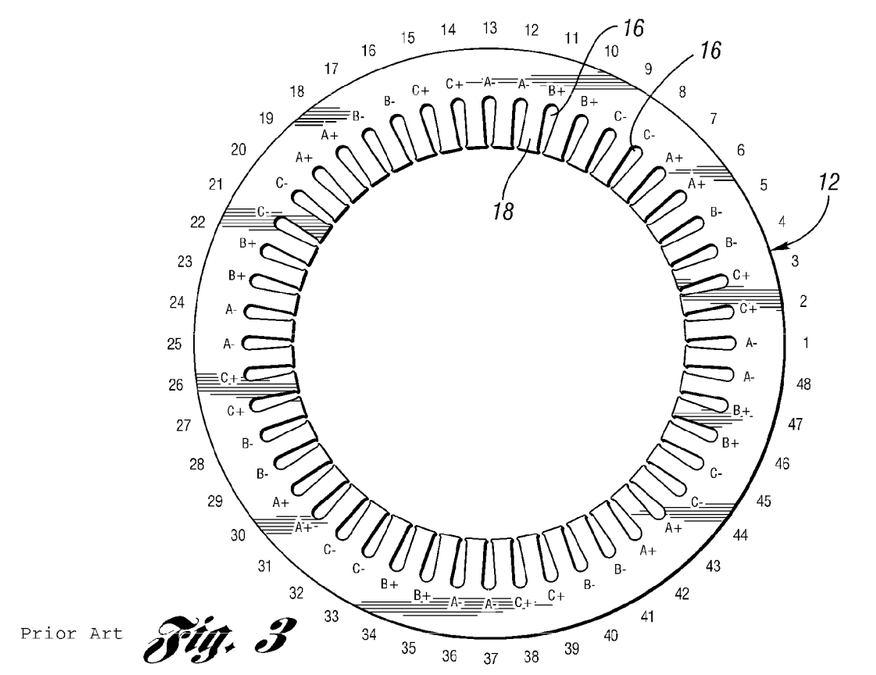
FIG. 3 is a plan view of a single lamination of the conventional stator illustrated in FIG. 1.

The inner periphery of the body 14 is formed with multiple radial slots 16. The slots are equally spaced about the inner periphery, as best seen in FIG. 3. The slots form stator teeth 18 which are of uniform width.

The conventional lamination design of FIG. 3 is for a stator in a three-phase machine. The phases are identified by reference characters A, B and C. Each reference character carries either a plus sign or a minus sign. The plus sign, for purposes of reference, designates the direction of entry of a single wire of the windings for one of the three phases. The minus sign is used to designate the emergence of a wire of the winding for that phase. This wiring pattern will be explained with respect to FIG. 5, which illustrates a single lamination for the stator of a second embodiment of the invention.

Figure 6:
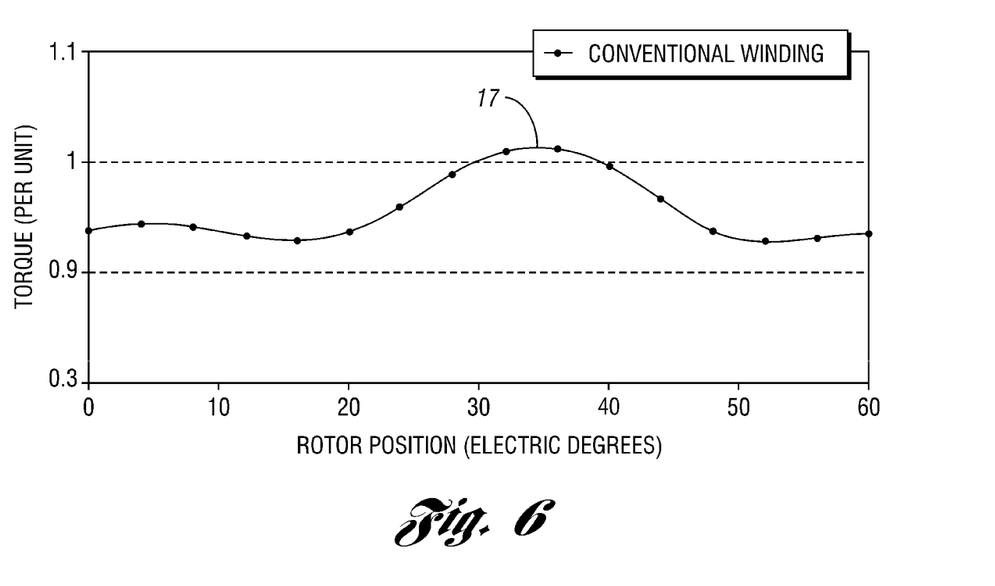
FIG. 6 is a plot showing torque ripple for various rotor positions for an electrical machine with a conventional stator construction.
Figure 7:
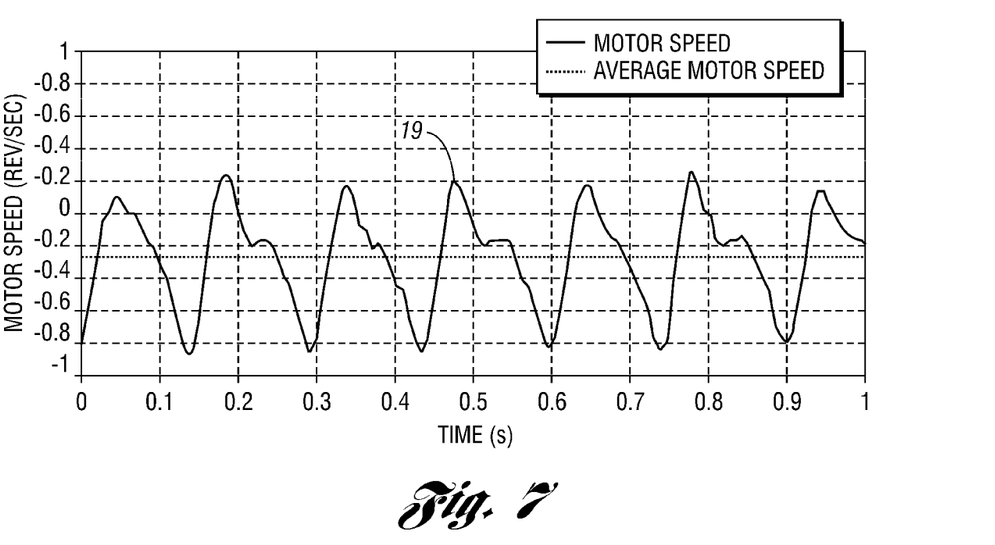
FIG. 7 is a time plot for motor speed fluctuations caused by the torque ripple illustrated in FIG. 4 for an electric machine having a conventional stator.

FIG. 6 shows the waveform for torque ripple 17 of a conventional electric machine and FIG. 7 shows the effect of torque ripples 19 on rotor speed. The present invention will reduce the magnitude of the speed "peaks" at 19 in the time plot of FIG. 7.

Figure 4:
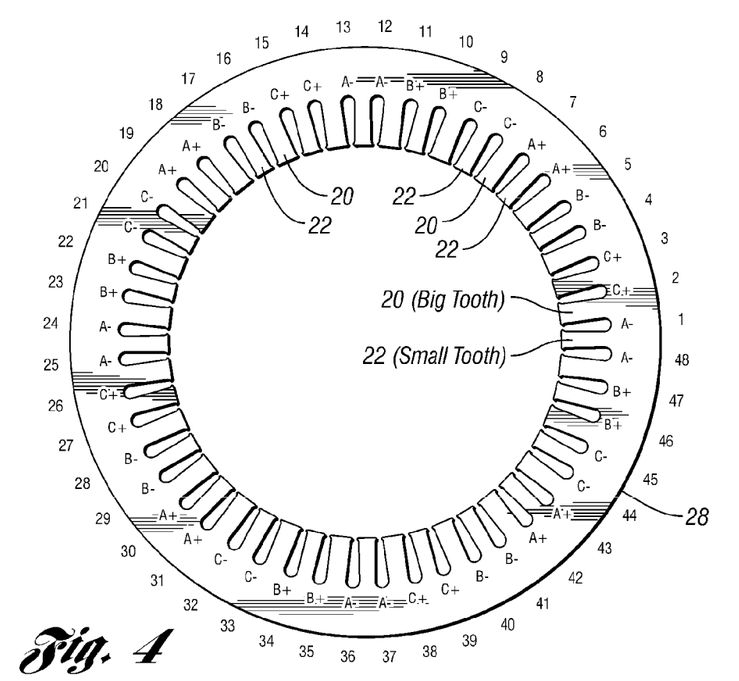
FIG. 4 is a plan view of a single lamination of a stator of a first embodiment of the present invention wherein the angular spacing of the stator slots are non-uniform, the width of one stator tooth defined by the stator slots having a thickness that is different than the thickness of an adjacent tooth.

FIG. 4 shows a single stator lamination for the first embodiment of the invention. It is characterized by 48 slots that define stator teeth. The slot numbers are identified by numerals 1 through 48, as indicated throughout the 360° extent of the lamination. The slots are arranged such that the teeth have a "big" width and a "small" width. Each of the teeth of each phase is identified by a reference numeral that is the same or a numeral that identifies a corresponding tooth of another phase.

A big tooth with a large circular width is located directly adjacent slot #1 for a first phase, as shown at 20. A small tooth with a lesser circular width for the first phase is shown at 22. A second set of big teeth and small teeth is identified by the letter B for a second phase. A third set of slots defining big teeth and small teeth is identified by the letter C. Each letter carries a plus sign or a minus sign depending upon whether the winding is entering a particular slot or is returning or emerging through a particular slot.

For the purpose of describing the stator coil winding pattern, it will be assumed that the winding begins at terminal 24 in FIG. 5. The winding illustrated in FIG. 5 has a pattern that is similar to the winding pattern for the stator design of each of the embodiments. FIG. 5 shows a slot pattern for a second embodiment of the invention, which has multiple slot groups, each group having teeth of three different peripheral widths. The winding enters slot #6 and extends to slot #1. The winding returns through slot #1. It then extends to slot #7 and enters slot #7. It returns through slot #12 and then enters slot #18. The winding then returns through slot #13 and enters through slot #19. The winding then returns through slot #24 and enters through slot #30. The winding then returns through slot #25 and enters through slot #31. The winding then returns through slot #36 and enters through slot #42. The winding then returns through slot #37 and enters slot #43. It is returned through slot #48. The winding then terminates at terminal 26 thereby completing the winding pattern for the first phase of a three-phase electric machine.

The windings for the other two phases B and C of a three-phase machine have a similar entry and return pattern. The teeth defined by slots 1 through 6 and their respective windings create a first pole. Similarly, a second pole is created by the teeth and the windings for slots #7 through #12. A third pole is established by the slots and the windings for slots #13 through #18. A fourth pole is established by the teeth and the windings for slots #19 through #24. A fifth pole is established by the teeth and the windings for slots #25 through #30. A sixth pole is established by the teeth and the windings for slots #31 through #36. A seventh pole is established by the teeth and the windings for slots #37 through #42. An eighth pole is established by the teeth and the windings for slots #43 through #48. Thus, there are a total of eight poles and 48 slots, which define three phases identified by the letters A, B and C.

The stator lamination for the first embodiment is identified by reference numeral 28 in FIG. 4. The corresponding stator lamination for the second embodiment of the invention is identified by numeral 30 in FIG. 5.

Figure 10:
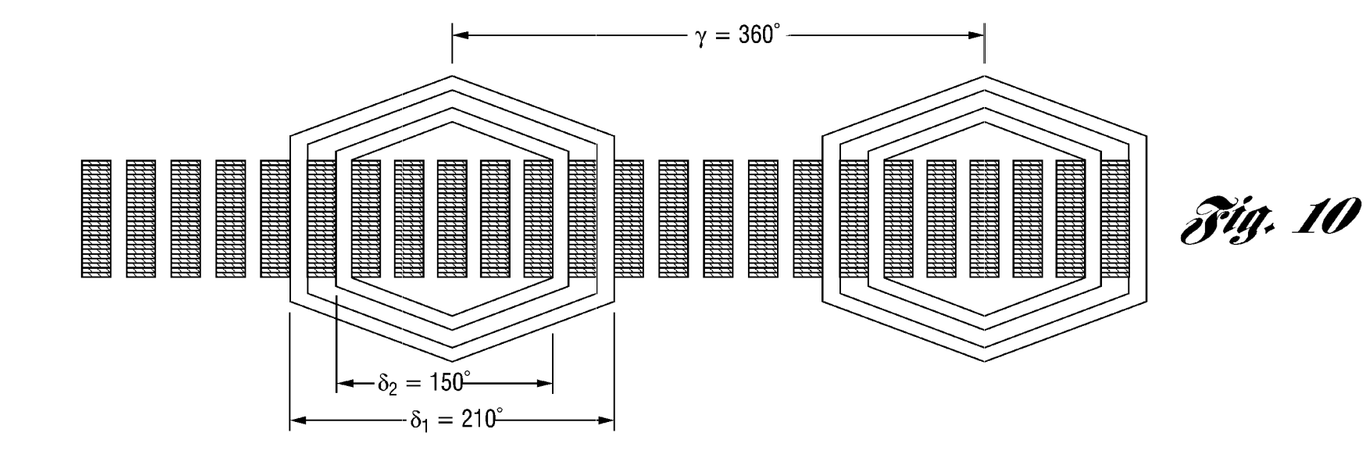
FIG. 10 is an unwrapped view of the slots of a conventional stator having 24 slots, four poles, two coil groups and two different coil pitches.
Figure 11:
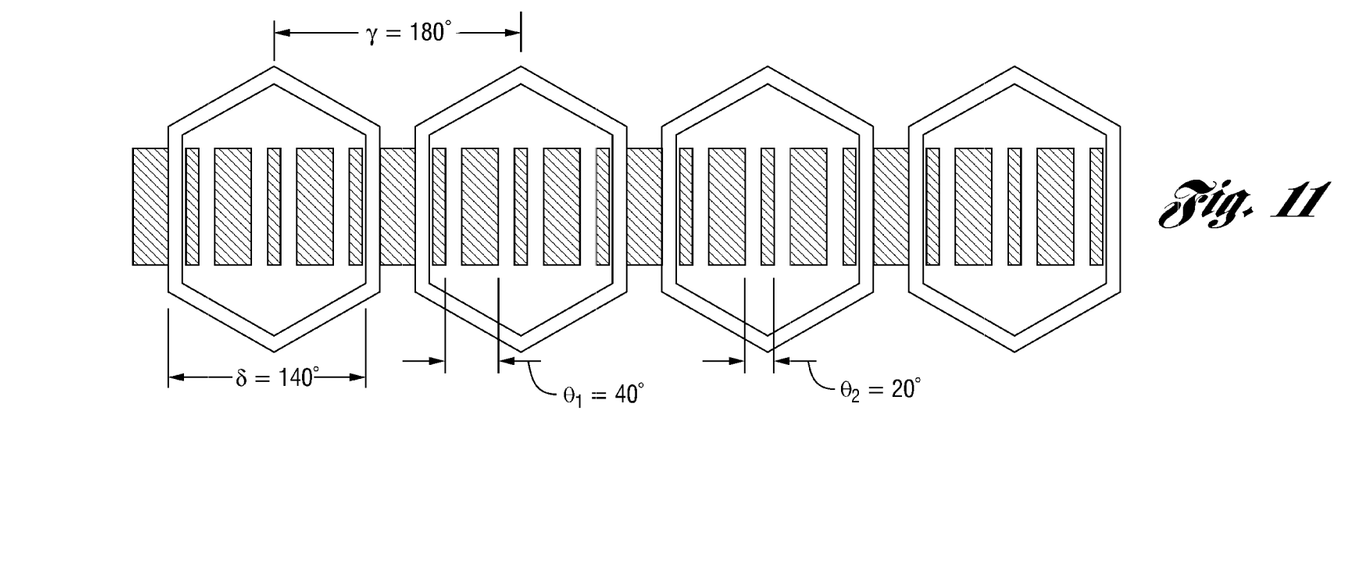
FIG. 11 is an unwrapped view of the stator slots of a first embodiment for the stator of the present invention wherein the stator has 24 slots and four poles.
Figure 12:
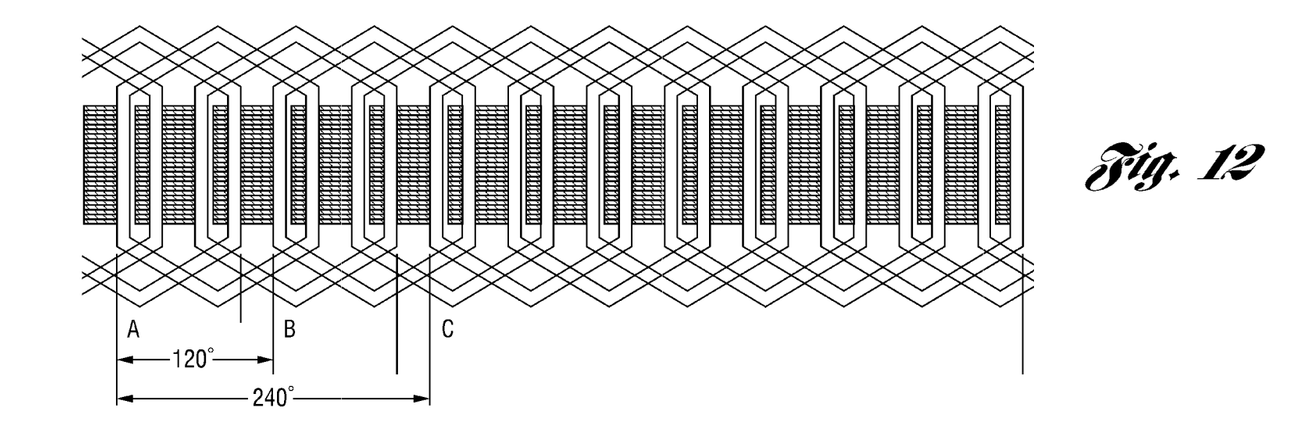
FIG. 12 is another illustration of the embodiment of FIG. 11 wherein three phase windings are shown.

As previously indicated, FIG. 11 shows a single phase winding for the first embodiment. FIG. 12 shows a three-phase winding pattern for the first embodiment of the invention seen in FIG. 4. The windings for a conventional stator design are indicated schematically in FIGS. 8, 9 and 10 by diagrammatic hexagons.

The hexagon diagrams of FIG. 8 are shown at 32. Each set of windings may have a coil pitch of 150 electrical degrees. Each slot pitch may be 30 electrical degrees. Each coil winding for a set of six slots may be 180 electrical degrees. In the embodiment of FIG. 8, each coil group 32 includes six slots.

FIG. 9 shows the phase windings of a conventional stator with 24 slots, four poles, two coil groups and a coil pitch of 180°. Again, the slot pitch is 30 electrical degrees as in the case of the design of FIG. 8. In the case of the windings of FIG. 9, the angular displacement between the coil groups is 360°.

The windings of the first coil group seen in FIG. 9 are identified by reference characters 34 and 36. The windings of each group pass through adjacent slots on either side of a stator tooth. The coil pitch of windings 34 and 36 is 180 electrical degrees. The adjacent coil group has two sets of windings 38 and 40, which are similar to windings 34 and 36, respectively, but they are spaced, one from the other, by 360 electrical degrees, rather than by 180° as indicated in FIG. 8.

Another phase winding for a conventional stator is shown in FIG. 10. In the case of FIG. 10, a phase winding has 24 slots, four poles and two coil groups. The angular displacement between two coil groups is 360°. A coil pitch for one winding of a coil group is 150 electrical degrees. The other coil pitch is 210 electrical degrees.

One example of a first embodiment of the invention is shown in the stator of FIG. 11, which has stator teeth with two thicknesses arranged in alternating sequence throughout the periphery of the stator. This results in two slot pitches. A coil group for the embodiment of FIG. 11 has three narrow (small) stator teeth. Two wide (big) stator teeth are disposed between the narrow stator teeth. The tooth pitch between one side of a narrow tooth and a corresponding side of a wide tooth may be 40 electrical degrees. The tooth pitch between a narrow tooth and the near side of a wide tooth in each coil group may be 20 electrical degrees. The angle of displacement between any two coil groups shown in FIG. 11 may be 180°. The coil pitch itself may be 140° for each group. The windings for the embodiment of FIG. 11 may be similar to the windings previously discussed with reference to FIG. 5.

FIG. 12 is a schematic illustration one example of the windings for each phase of a three-phase machine. The windings for phases B and C may be identical to the windings described with reference to FIG. 11 for the first phase, (i.e., phase A). Phase B for FIG. 11 may be displaced angularly 120 electrical degrees from the windings for phase A. The windings for phase C in FIG. 11 may be displaced 240 electrical degrees with respect to the placement of the windings for phase A.

As in the case of the schematic diagrams of FIGS. 10, 11 and 12, the connection between the windings of each coil group is not shown.

Figure 13:
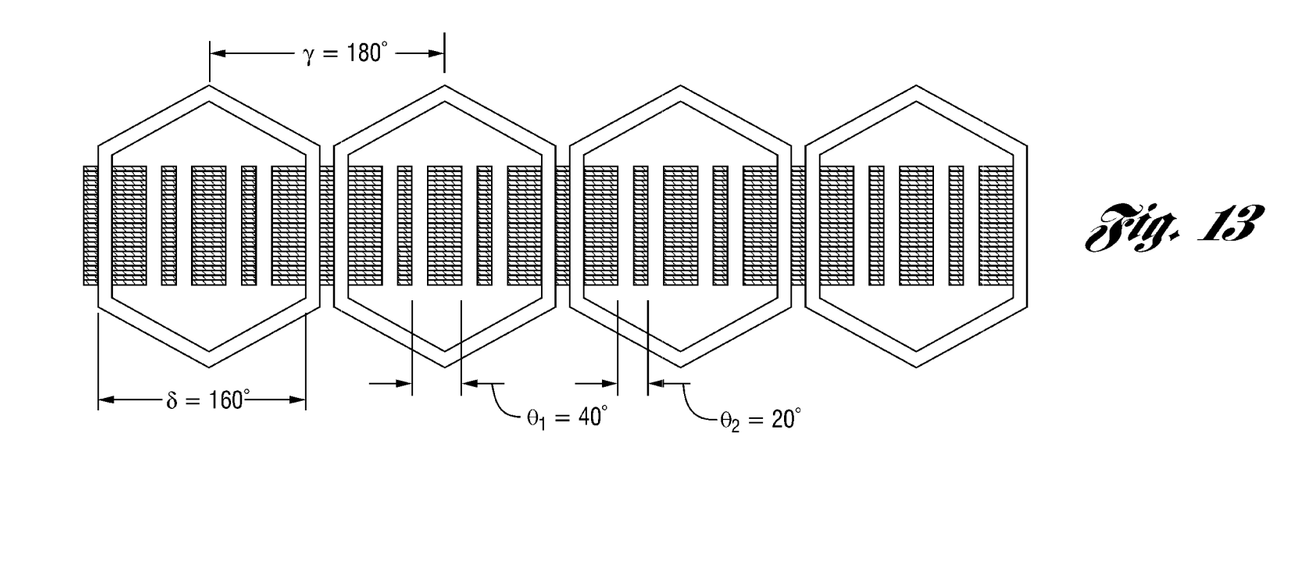
FIG. 13 is an unwrapped view of the stator slots of a second embodiment of the invention wherein the windings are shown in four groups as in the case of the embodiment of FIG. 11.

FIG. 13 shows a winding pattern for the first embodiment of the invention, which is similar to the winding pattern of FIG. 11 except that the coil edge of one coil group is shifted by one stator slot. The angular displacement between two adjacent coil groups in FIG. 13 is equal to the width of the narrow stator tooth in FIG. 13 rather than the width of the wide stator tooth in FIG. 11. An example of coil pitch is shown in FIG. 13, where coil pitch is increased to 160 electrical degrees rather than 140 electrical degrees for the example shown in FIG. 11.

Figure 14:
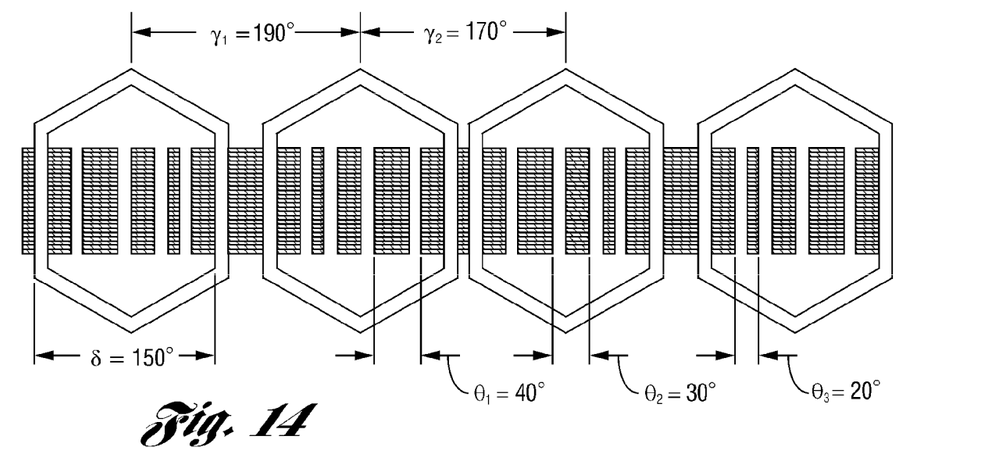
FIG. 14 is an unwrapped view of the stator slots of a third embodiment of the invention wherein the windings are shown in four groups as in the case of the embodiment of FIG. 11.

FIG. 14 shows a third stator embodiment that has three different tooth thicknesses. Specifically, the embodiment of FIG. 14 has a wide tooth thickness, a medium tooth thickness and a narrow tooth thickness in each coil group. The angular spacing between adjacent coil groups in the embodiment of FIG. 14 is different by β electrical degrees. This is due to the different thicknesses of the stator teeth. Further, the design of FIG. 14 has three slot pitches; namely, 40 electrical degrees, 30 electrical degrees and 20 electrical degrees. Again, the connection between the coils is not shown in FIG. 14. The pattern of the phase windings for FIG. 14 may be the same as that for the first embodiment of the invention as seen in FIG. 11.

In FIG. 14, β=20 electrical degrees (i.e., 190°−170°=20°. The value β, however, may be different than 20°, depending on design choice.

Figure 15:
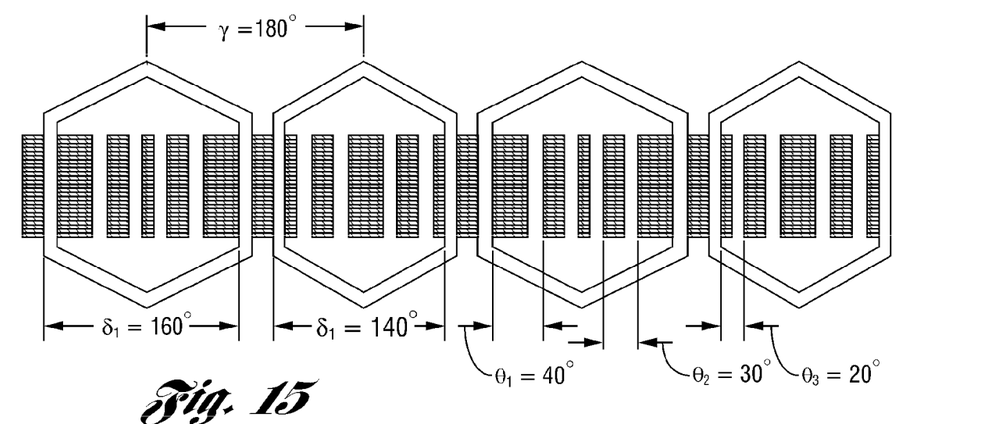
FIG. 15 is an unwrapped view of the slots of a fourth embodiment of the invention wherein coil groups of different coil pitch are used.

A fourth embodiment of the invention is seen in FIG. 15. The coils for phase A in FIG. 15 have two coil pitches; namely, 160 and 140 electrical degrees. The angular displacement between two adjacent coil groups of the same phase is 180 electrical degrees. The stator has three slot pitches; namely, 40°, 30° and 20°.

There are more variations of the embodiments shown in FIGS. 11 through 15, which will be apparent to a skilled artisan.

In addition to the tooth size variations and the winding pattern for the coils for the embodiments of FIGS. 11-15, other tooth spacings and winding patterns can be used without departing from the scope of the invention.

Figure 16:
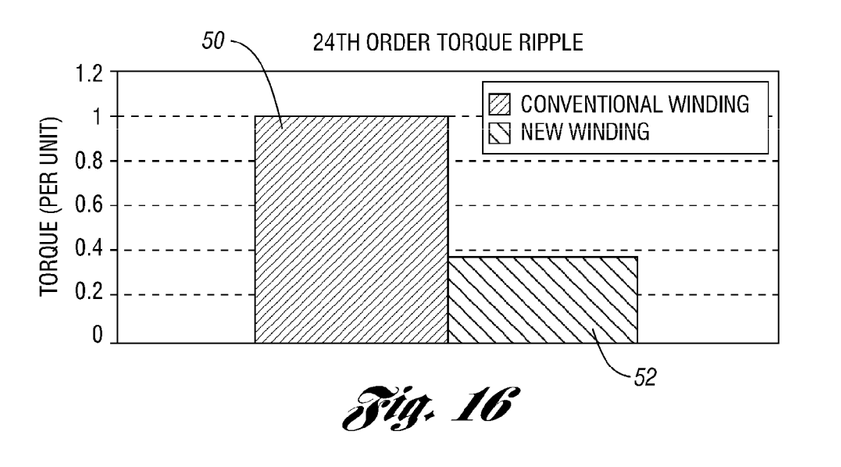
FIG. 16 is a chart showing a comparison of a 24$^{th}$ order torque ripple for a machine having a stator embodying the features of the present invention relative to the torque ripple for an electric machine having a conventional stator.

FIG. 16 is a representation of the degree of improvement that may be obtained using the stator construction and the stator winding pattern of the present invention. Using a conventional stator construction and a conventional stator winding pattern, the torque that is characteristic of a $24^{th}$ order torque ripple is shown at 50. The comparable torque of a $24^{th}$ order torque ripple is shown at 52 using the improved stator construction and stator winding pattern of the invention.

Although embodiments of the present invention have been disclosed, it will be apparent that modifications may be made by persons skilled in the art without departing from the scope of the invention. All such modifications and equivalents thereof are intended to be covered by the following claims.

What is claimed:

1. An electric machine comprising:
a rotor;
a stator including a plurality of teeth extending toward the rotor and defining a plurality of slots, wherein each adjacent pair of the slots is spaced according to one of at least three different slot pitches and wherein each of the at least three different slot pitches is different than multiples of the other two of the at least three different slot pitches; and
a plurality of windings wound in the slots to form coils, wherein at least one of the windings is wound around at least two of the teeth to form one of the coils around the at least two of the teeth.

2. The machine of claim 1 wherein each of the coils has a coil pitch and wherein at least one of the coil pitches is different than a multiple of one of the slot pitches.

3. The machine of claim 1 wherein each adjacent pair of the coils is spaced according to an electrical angular displacement and wherein at least one of the electrical angular displacements is different than a multiple of one of the slot pitches.

4. An electric machine comprising:
a rotor;

a stator including a plurality of teeth extending toward the rotor and defining a plurality of slots, wherein each adjacent pair of the slots is spaced according to a slot pitch; and, a plurality of windings wound in the slots to form coils, wherein each of the coils has a coil pitch, wherein at least one of the coil pitches is different than a multiple of one of the slot pitches, and wherein at least one of the windings is wound around at least two of the teeth to form one of the coils around the at least two of the teeth.

5. The machine of claim 4 wherein some of the slot pitches are different than other of the slot pitches.

6. The machine of claim 4 wherein each adjacent pair of the coils is spaced according to an electrical angular displacement and wherein at least one of the electrical angular displacements is different than a multiple of one of the slot pitches.

7. An electric machine comprising:

a rotor;

a stator including a plurality of teeth extending toward the rotor and defining a plurality of slots, wherein each adjacent pair of the slots is spaced according to a slot pitch; and, a plurality of windings wound in the slots to form coils, wherein each adjacent pair of the coils is spaced according to an electrical angular displacement, wherein at least one of the electrical angular displacements is different than a multiple of one of the slot pitches, and wherein at least one of the windings is wound around at least two of the teeth to form one of the coils around the at least two of the teeth.

8. The machine of claim 7 wherein some of the slot pitches are different than other of the slot pitches.

9. The machine of claim 7 wherein each of the coils has a coil pitch and wherein at least one of the coil pitches is different than a multiple of one of the slot pitches.

* * * * *